United States Patent
Javaid

(10) Patent No.: US 10,933,767 B2
(45) Date of Patent: Mar. 2, 2021

(54) ELECTRIC VEHICLE ENERGY SHARING MARKETPLACE

(71) Applicants: Hyundai Motor Company, Seoul (KR); KIA Motors Corporation, Seoul (KR)

(72) Inventor: Bilal Javaid, Ada, MI (US)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 112 days.

(21) Appl. No.: 16/239,799

(22) Filed: Jan. 4, 2019

(65) Prior Publication Data

US 2020/0215929 A1 Jul. 9, 2020

(51) Int. Cl.
| | |
|---|---|
| *H02J 7/00* | (2006.01) |
| *B60L 55/00* | (2019.01) |
| *B60L 53/66* | (2019.01) |
| *G06Q 30/02* | (2012.01) |
| *G01C 21/34* | (2006.01) |
| *H04W 4/46* | (2018.01) |
| *B60L 58/13* | (2019.01) |
| *G06Q 20/32* | (2012.01) |

(52) U.S. Cl.
CPC ............ *B60L 55/00* (2019.02); *B60L 53/665* (2019.02); *B60L 58/13* (2019.02); *G01C 21/3469* (2013.01); *G06Q 20/3278* (2013.01); *G06Q 30/0283* (2013.01); *H04W 4/46* (2018.02)

(58) Field of Classification Search
CPC ......... Y02E 60/12; H02J 7/0068; H02J 7/022; H02J 7/0073; H01M 10/44
See application file for complete search history.

(56) References Cited

U.S. PATENT DOCUMENTS

| | | | |
|---|---|---|---|
| 2008/0221746 A1* | 9/2008 | Plishner | H02J 3/008 701/22 |
| 2009/0174365 A1* | 7/2009 | Lowenthal | G07F 15/005 320/109 |
| 2009/0177595 A1* | 7/2009 | Dunlap | B60L 53/65 705/412 |
| 2010/0191585 A1* | 7/2010 | Smith | G07F 17/24 705/13 |
| 2011/0130885 A1* | 6/2011 | Bowen | H02J 3/14 700/291 |

(Continued)

FOREIGN PATENT DOCUMENTS

CN 206353716 U 7/2017

OTHER PUBLICATIONS

Electric Vehicle Battery: Materials, Cost, Lifespan; Union of Concerned Scientists; Mar. 9, 2018.

(Continued)

*Primary Examiner* — Arun C Williams
(74) *Attorney, Agent, or Firm* — Brinks Gilson & Lione

(57) ABSTRACT

Disclosed herein is a system for wirelessly transferring electric power from one electric vehicle to another, and a method of transferring charge. The charging system may establish a communications link between a buying vehicle and a selling vehicle, and may communicate with a marketplace server to facilitate the financial transactions associated with transferring electric power. The disclosure provides for a vehicle-to-vehicle transfer of charge while the vehicles are in motion.

20 Claims, 7 Drawing Sheets

(56) References Cited

U.S. PATENT DOCUMENTS

2013/0038284 A1* 2/2013 LaFrance ............... B60L 53/65
320/109
2014/0159653 A1 6/2014 Von Novak et al.
2019/0143828 A1* 5/2019 Sawada ................ B60L 53/60
340/934

OTHER PUBLICATIONS

Singh, Timon; "Laser-Powered Helicopter Breaks World Record," Inhabitat, Oct. 15, 2018.
Wireless charging for electric vehicle with microwaves [IEEE 2013 $3^{rd}$ International Electric Drives Production Conference (EDPC); Nuremberg, Germany (Oct. 29, 2013-Oct. 30, 2013)] 2013 $3^{rd}$ International Electric Drives Production conference (EDPC).
Ma, Yue, "Wireless Energy Transfer," Stanford, Oct. 22, 2010.

* cited by examiner

ELECTRIC VEHICLE ENERGY SHARING MARKETPLACE

FIELD

The present disclosure relates to systems and methods for charging an electric vehicle and for facilitating a financial transaction related to charging.

BACKGROUND

The statements in this section merely provide background information related to the present disclosure and may not constitute prior art.

Electric vehicles are being developed as an alternative to vehicles powered by petroleum based fuels such as gasoline. Electrically powered vehicles may eliminate or reduce exhaust pollutants that would have otherwise been emitted during the combustion process, and result in a reduction in vehicle noise.

Electric vehicles are generally powered by a battery, which involves periodic recharging of said battery in order to continue operation. Typically, electric vehicles are charged where the vehicle is parked, either from a wall outlet at the home of the owner, or at a dedicated charging station in a predetermined location on the road, such as at a service station. Even a rapid charger can require thirty minutes or more to fully charge a vehicle, which may be perceived as a significant delay by consumers who are accustomed to a refueling procedure for a gasoline vehicle which takes about five minutes. In addition, electric vehicles tend to have a shorter range than do gasoline-powered vehicles, making refueling stops both lengthier and more frequent compared to conventional technologies to which consumers have become acclimated.

As electric vehicles become more numerous, the demand for charging solutions has increased. In some communities, charging apparatus is being embedded directly in roads so that vehicles passing over the apparatus charge even when in operation. However, not all roadway will be constructed with such charging apparatus; for example, perhaps only freeways will be constructed with a dynamic charge lane, whereas city roads will not. A vehicle which is completely depleted of charge is not mobile, and without a charging station, may become effectively abandoned.

Likewise, the economics of charging the fleet of electric vehicles nationwide are only in their earliest stages, with much to be determined in this area.

SUMMARY

Further areas of applicability will become apparent from the description provided herein. It should be understood that the description and specific examples are intended for purposes of illustration only and are not intended to limit the scope of the present disclosure.

Disclosed herein is method of transferring electric power between two vehicles. The method may include determining, by a processor, a charge level of a first vehicle, and activating, by the processor, one of a buy mode and a sell mode in the first vehicle based on the charge level. The method may include establishing, by a vehicle-to-vehicle communication, a communications link with a second vehicle. The method may include determining whether the second vehicle is in a buy mode if the first vehicle is in the sell mode, or if the second vehicle is in a sell mode if the first vehicle is in the buy mode. When the first vehicle is in the buy mode and the second vehicle is in the sell mode, the method may include determining a quantity of electric power to receive and beginning to receive the quantity of electric power from the second vehicle. When the first vehicle is in the sell mode and the second vehicle is in the buy mode, the method may include determining a quantity of electric power to transfer and beginning to transfer the quantity of electric power to the second vehicle.

The present disclosure also describes a system for transferring electric power between two vehicles. The system may include, in a first vehicle, one or more processors, and a user interface in communication with the one or more processors. The system may also include a communications system configured to communicate directly or indirectly with a second vehicle. The system may include a charging element for transferring or receiving electric power to or from the second vehicle. The charging element may be in electrical connection with the one or more processors. The processor may be configured to activate a buy mode and a sell mode, and to determine whether the second vehicle is in a buy mode or a sell mode.

DRAWINGS

In order that the disclosure may be well understood, there will now be described various forms thereof, given by way of example, reference being made to the accompanying drawings, in which.

Figure 1:
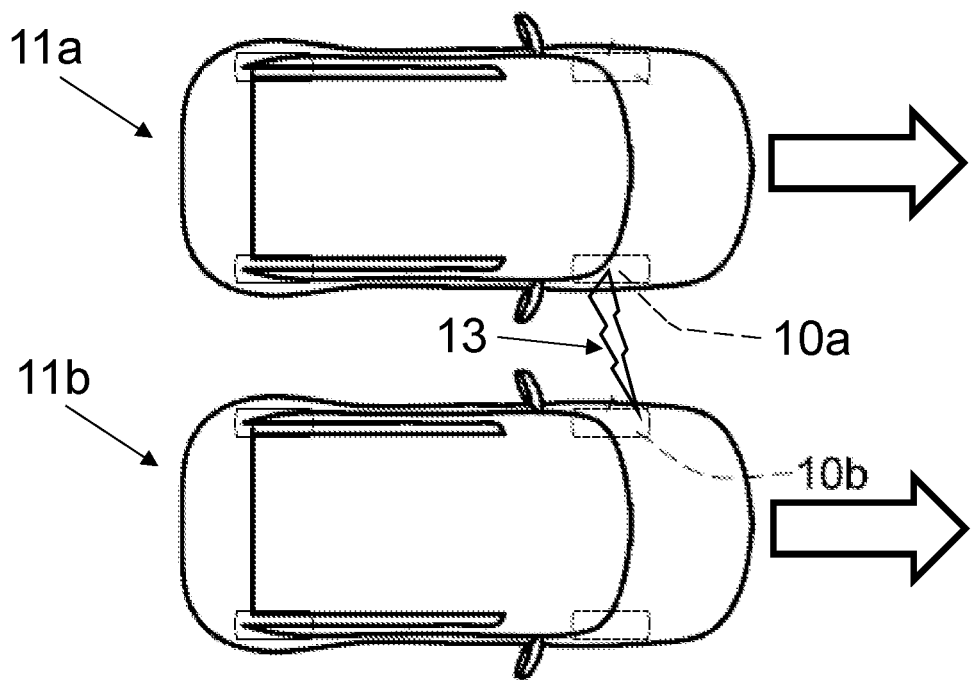
FIG. 1 is a view showing two vehicles in a charging configuration in accordance with the principles of the present disclosure.

The drawings described herein are for illustration purposes only and are not intended to limit the scope of the present disclosure in any way.

DESCRIPTION

The following description is merely exemplary in nature and is not intended to limit the present disclosure, application, or uses. It should be understood that throughout the drawings, corresponding reference numerals indicate like or corresponding parts and features.

The present disclosure is not limited the matter disclosed below and will be understood in different forms which differ from each other. The examples provided merely make the disclosure complete and provide for fully informing the scope to those skilled in the art. In the drawings, like reference numerals refer to like elements.

Throughout this specification and the claims which follow, unless explicitly described to the contrary, the word "comprise" and variations such as "comprises" or "comprising" will be understood to imply the inclusion of stated elements but not the exclusion of any other elements.

One way to increase the ease of charging an electric vehicle may be to equip such vehicles with apparatus that allows for dynamic charging; that is, charging the battery or power supply of the vehicle while it is in motion. In such cases, the source of charge to be received by one vehicle may be another moving electric vehicle. For example, a vehicle with full or nearly full charge may be able to activate a power transfer mode in which it delivers electric power from its surplus of charge to a less-charged vehicle.

FIG. 1 illustrates a first vehicle 11a and a second vehicle 11b in a vehicle-to-vehicle wireless charging arrangement. Each vehicle 11a/11b has a wheel 10a/10b, respectively, which is equipped with a wireless charging device constructed in accordance with the description that follows. The vehicles 11a/11b are positioned such that the wheels 10a/10b are in proximity such that a charge 13 may be passed from the donor vehicle to the recipient vehicle. In the arrangement of FIG. 1, vehicle 11a is providing a charge 13 to vehicle 11b as the vehicles are in motion, as indicated by the arrows.

In the illustration of FIG. 1, the wheel 10a of vehicle 11a has a wireless charging device disposed on it and is the front passenger-side wheel, while the wheel 10b of vehicle 11b, which receives the charge 13, is a driver-side wheel. A vehicle in accordance with the principles of the present disclosure may have such a charging device on any wheel, and particularly, on more than one wheel, for increased convenience.

Figure 2:
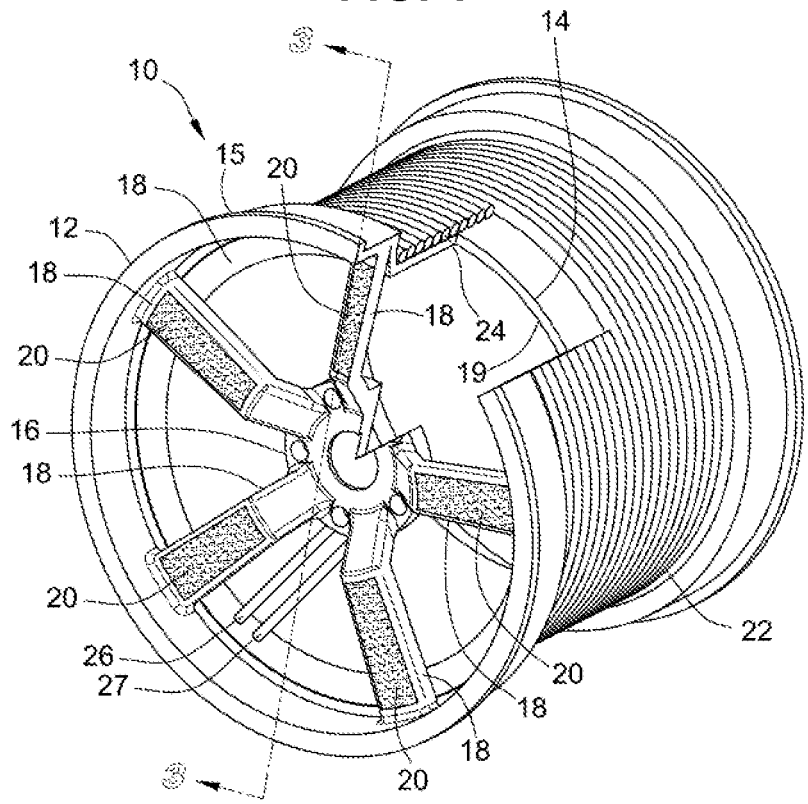
FIG. 2 is a cutaway perspective view of a wheel constructed in accordance with the principles of the present disclosure.

FIG. 2 illustrates one example of a wheel 10 for use in a charging system. It should be noted that the charging system may not necessarily make use of a charging component disposed on a wheel, and that other arrangements will be effective to assemble the charging systems for use in charge transfer methods disclosed and described herein.

In the device illustrated in FIG. 2, the wheel 10 has a wheel center 16, and a cylindrical barrel 12 disposed radially about the wheel center 16. Barrel 12 has an outer surface 14 and an inner surface 19. A plurality of spokes 18 may extend from the wheel center 16 to the barrel 12, such as to the rim 15 of barrel 12. The wheel components, such as the barrel and the spokes, may be made of a substantially non-conductive carbon fiber material.

Conductive element 22 is wound about the barrel 12. The conductive element 22 may be a wire that is wound about the barrel 12 as a plurality of windings 24. In one aspect, the conductive element 22 may be a Litz wire, including multiple strands that are twisted, braided, or woven together. For the purposes of this description the conductive element 22 may also be referred to as a coil, though the entire length of the conductive element 22 may not be coiled. The coil can be made of a metal, including copper, or of any material suitable for the generation and transmission of electrical charge.

The wheel 10 according to the present disclosure may include elements made of ferrite materials thereon. For example, the wheel 10 may include a ferrite layer 30 on the inner surface 19 of barrel 12, as can be seen in FIG. 3, which enhances the coupling between windings 24 of coil 22.

Optionally, some or all of spokes 18 may have a ferrite layer 20 disposed over their exterior surface.

Figure 3:
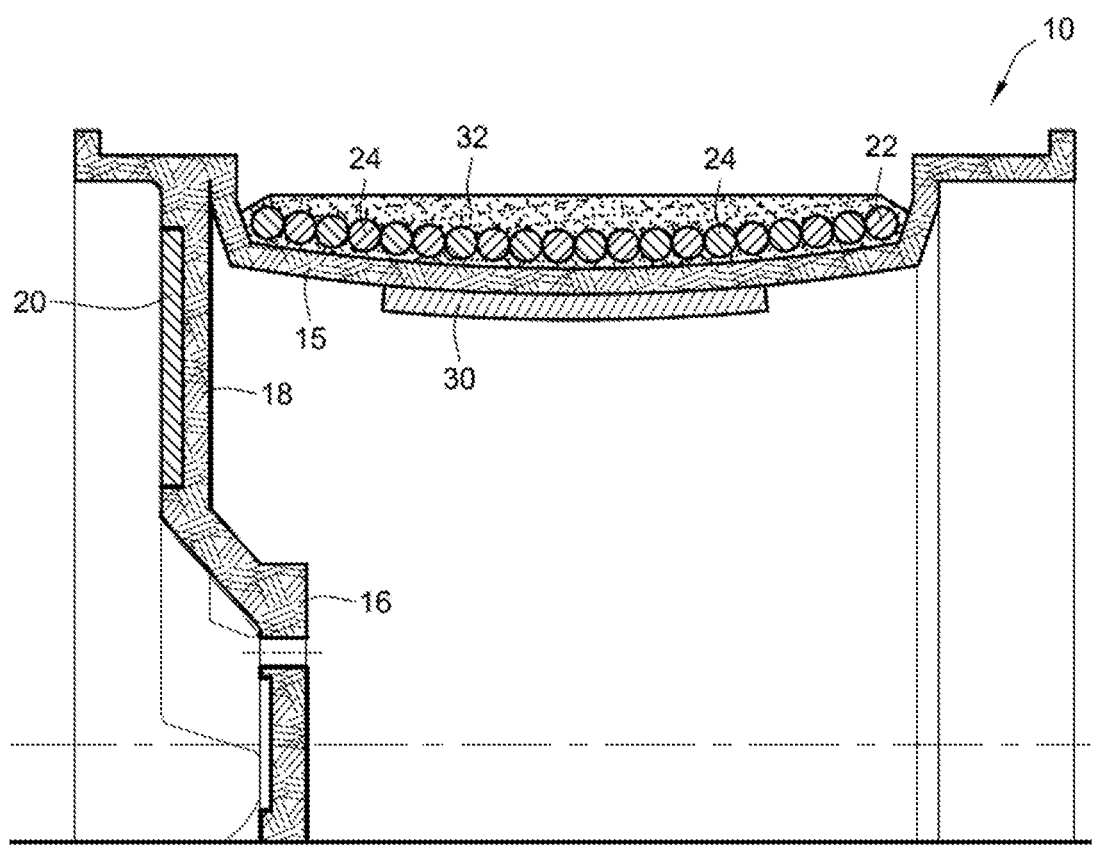
FIG. 3 is a cross sectional view of a portion of the wheel of FIG. 2 taken across line 3.

FIG. 3 is a cross-sectional view of the wheel of FIG. 2. The windings 24 of the coil or conductive element 22 may be disposed in a layer 32 of potting material for mechanical stability. The potting material may be a substantially electrically insulating material, such as a polymer including, for example, polyurethane.

A charging system of the present disclosure may have bi-directional charging capability. That is, the charging system may be capable of both transmitting a charge to a vehicle, or receiving one. The arrangement including wheel 10 of FIGS. 2 and 3 has such a bi-directional charging capability. Likewise, in this aspect, the tire of the wheel is not affected or interfered with by the charging components, and is simply fit over the wheel as would be done on a conventional wheel.

A charging device associated with an automobile component such as a wheel, as described above, may be used to buy or sell charge from similarly equipped vehicles when on the road. For example, an under-charged vehicle can be paired with a well-charged or fully-charged vehicle equipped with a similar charging device, and as described with reference to the description below, may receive a certain amount of electric power when the vehicles are in proximity to one another, even when they are traveling along the roadway. This provides convenience and avoids a stop partway through a journey.

Figure 4:
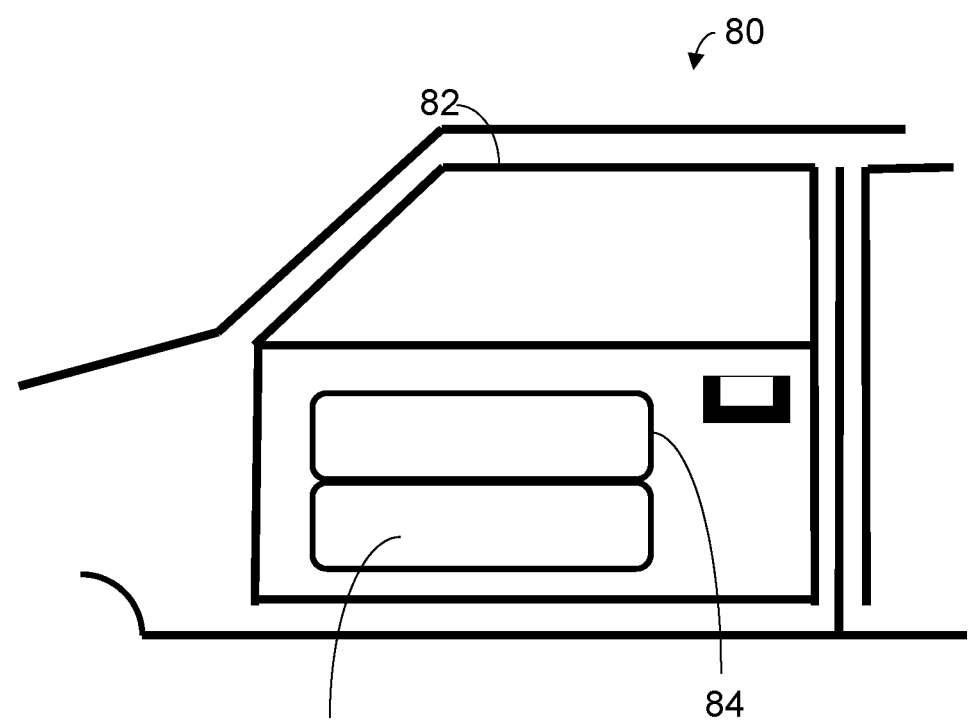
FIG. 4 is a view of a vehicle door including a wireless charging device useable in conjunction with a method or system as disclosed herein.

FIG. 4 illustrates a portion of a vehicle 80 according to another aspect of the disclosure. Rather than a charging device or charging system component associated with a wheel of the vehicle as in FIGS. 2 and 3, the components of the charging device may be disposed on or in a door 82 of vehicle 80. In one aspect, the charging device may be a microwave power transfer antenna system. The antenna system may include a receiver 84 and a transmitter 86 to transfer electric power. The transmitter 86 may include a transmitting antenna array, and the receiver 84 may be a receiving antenna array, or "rectenna."

A microwave antenna array can use beamforming to precisely direct radiation from the selling vehicle to the buying vehicle. Beamforming allows for targeting of the energy that is delivered, so that the receiving vehicle can be slightly ahead of or slightly behind the transmitting vehicle. Moreover, longer distance power transfer may be possible because of the lack of near-field coupling between the receiver and the antenna.

In the aspect illustrated in FIG. 4, the portion of the door 82 covering the receiver 84 and the transmitter 86 may be made of a material that permits ready transmission of microwave radiation, such as fiberglass, rather than steel. The components in the door 82 are in electrical connection with the vehicle battery, and may involve the use of radiofrequency circuits in transferring charge.

Figure 5:
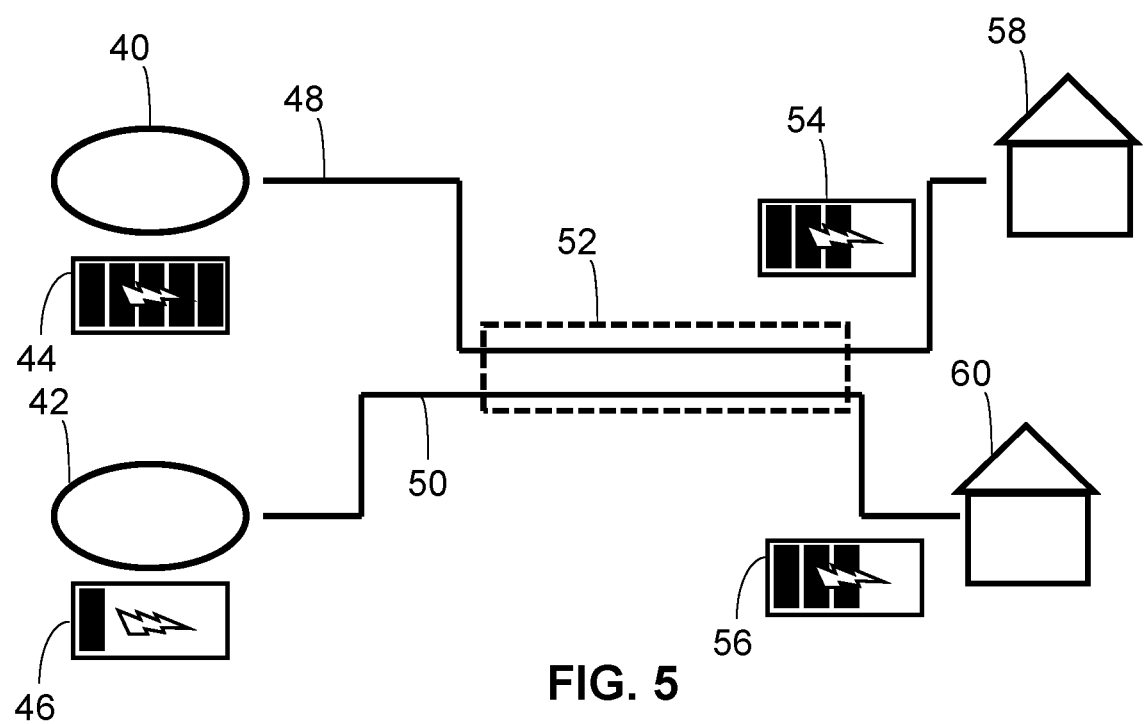
FIG. 5 is a schematic view of two vehicles adjusting their navigation routes on the way to their destinations in order to facilitate charge transfer according to the principles of the present disclosure.

FIG. 5 illustrates a first vehicle 40 having a full charge 44 and being on a route 48 to a destination, while second vehicle 42 has a low amount of charge 46 and is on a different route 50 to a destination 60. As will be described in more detail later, the second vehicle 46 may be in a power buying mode due to a desire to charge the battery dynamically, rather than taking the time to stop and charge, and may be broadcasting a signal (such as by a vehicle-to-vehicle (V2V) network) to identify a vehicle in a power selling mode in order to acquire this charge. Meanwhile, the first vehicle may be in a power selling mode, or if not, may display a prompt for the user indicating that another vehicle in the area has activated a buy mode, and asking whether the user would like to activate sell mode. When the first vehicle 40 and the second vehicle 42 have reached an agreement as to an amount of charge to transfer and an associated price, the vehicles 40/42 may navigate such that their charging components are brought into alignment and into such a proximity that electric power can be transferred, and they drive a common route 52 until the agreed-upon power level is reached. At that point, first vehicle 40 has an increased amount of charge 54, and second vehicle 42 has a decreased amount of charge 56, relative to the beginning of the procedure.

It is understood that the methods disclosed herein may be executed by at least one controller. The term "controller" refers to a hardware device that includes a memory and a processor configured to execute one or more steps. The memory is configured to store algorithmic steps and the processor is specifically configured to execute said algorithmic steps to perform one or more processes which are described further below.

Furthermore, the control logic of the present disclosure may be embodied as non-transitory computer readable media on a computer readable medium containing executable program instructions executed by a processor, a controller, or the like. Examples of computer readable media include, but are not limited to, ROM, RAM, compact disc (CD)-ROMs, magnetic tapes, floppy disks, flash drives, smart cards, and optical data storage devices. The computer readable recording medium can also be distributed in network coupled computer systems so that the computer readable media are stored and executed in a distributed fashion.

The electric vehicles described herein may operate within an online marketplace for buying and selling electric charge in dynamic fashion. Such a marketplace may allow for the creation and maintenance of user accounts which may in turn be linked to particular vehicles (such as by a vehicle identification number). The user account may also be linked to financial information for the user in order to facilitate disbursement and receipt of payment associated with a dynamic charge transaction.

The marketplace may be accessed via a user interface in a vehicle, and may be operatively connected with a navigation system of the vehicle.

Figure 6:
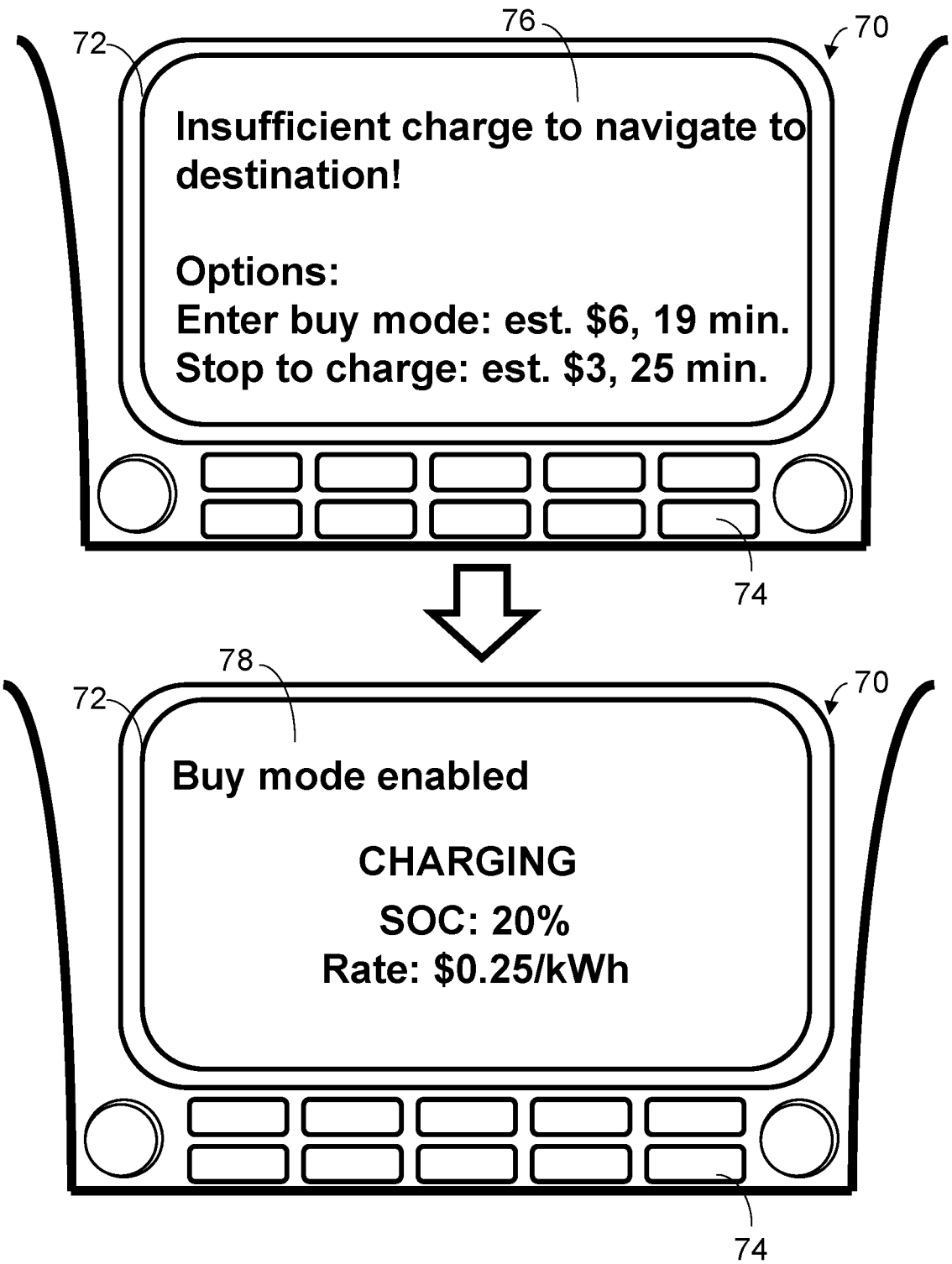
FIG. 6 illustrates views of a user interface for use with a method or system in accordance with the principles of the present disclosure.

FIG. 6 illustrates a user interface 70 for accessing the marketplace, which is accessible through the head unit 72 of the vehicle. The energy marketplace application may be constantly running in the background, or may be activated or inactivated by the user manually and as needed. As shown in the top panel of FIG. 6, the user has instructed the navigation system to provide directions to a destination. The charge system, using one or more processors, and due to the operative connection with the navigation system, has checked the charge level of the battery and, using a fuel efficiency estimate stored in memory, has calculated that the current level of charge will be insufficient to reach the requested destination without refueling. In the top panel, the head unit 72 has displayed a warning message 76, providing options including entry into buy mode, or stopping to charge the vehicle. The user is able to use keys 74 to provide a reply to this inquiry. In the bottom panel, the user has instructed the system to enter buy mode, and has identified a second vehicle from which to buy power (as will be described below.) The head unit 72 now displays a buy status 78 with the amount of charge and the cost per unit of power that the user has opted to purchase.

The application associated with the system can be customized in numerous ways while remaining within the scope of the present disclosure. For instance, a user may set up a profile with default settings that may provide a variety of parameters, such as a maximum price per kilowatt hour of energy he is willing to pay in a buy mode, or a minimum price per kilowatt hour in a sell mode. The application may also store whether the user wishes to be prompted every time another vehicle makes a request, or only during a driving session in which the user has specified that he is willing to sell. The user might also specify a maximum distance out of the way of the navigation destination he is willing to go to facilitate charging from a customer. The processor may be able to calculate an estimated charging time, and estimated cost, and display these, and so forth.

Figure 7:
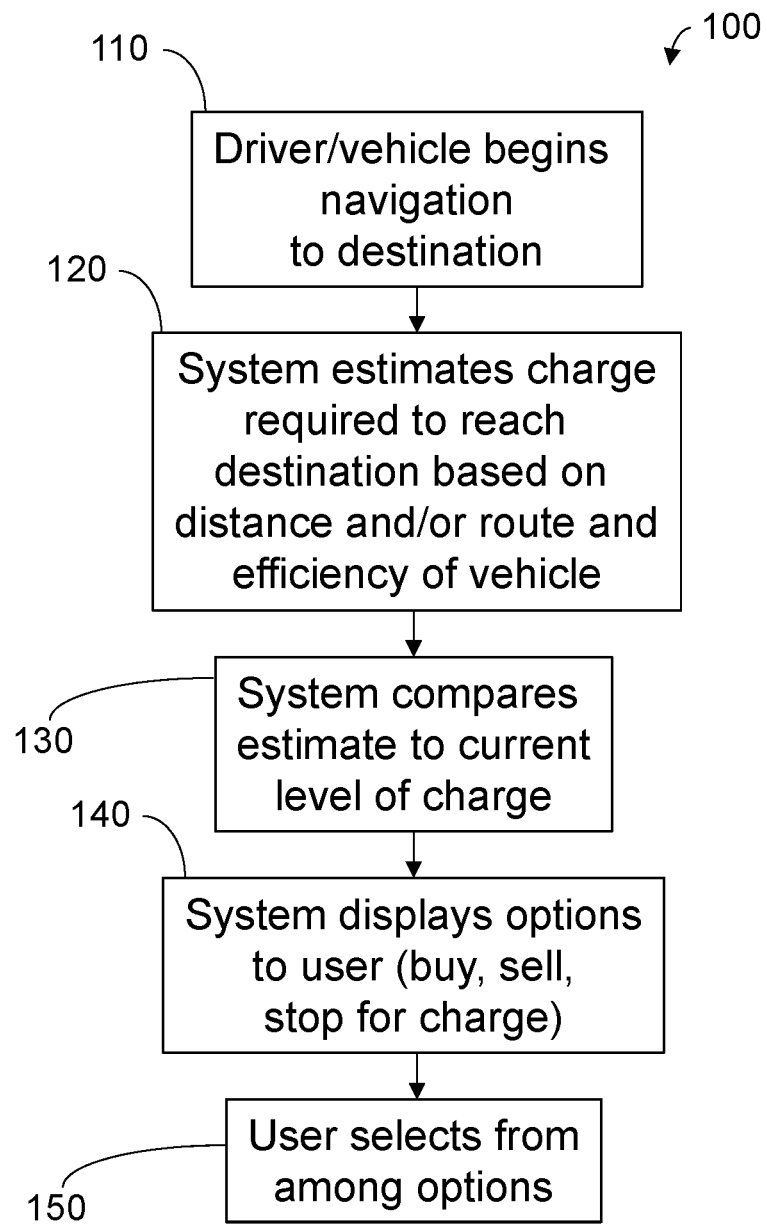
FIG. 7 is a flowchart illustrating steps of a method for transferring electric power from one vehicle equipped with a charging device to another in accordance with the principles of the present disclosure.

FIG. 7 is a method 100 for determining whether the vehicle will require charging to reach a specified destination, or whether it will have a sufficient excess of charge and can be used in a sell mode, and which provides prompts to take action. In a first step 110 of the method 100, the vehicle begins navigation to a destination specified by the user. By at least one processor or controller, in a step 120, the system uses at least one efficiency value stored in memory to calculate how much charge will be required in order to arrive at the destination. The processor, for at least this step, is in electrical connection with the navigation system and with the battery.

In step 130, the system compares the amount of power required to reach the destination to the amount available in the battery. The system may interact with the navigation system to determine the route that the vehicle is to take, and may also have access to a database, or a plurality of databases, which store information about the route and the current conditions, such as the road type, speed limits, current traffic, the weather, the power needs of a heating and/or cooling system, and so forth, that will impact how much charge is expected to be consumed by the vehicle as it traverses the route. In some aspects, data from numerous vehicles may be reported to the marketplace server, which may use machine learning to improve the energy use estimate. In another instance, the processor of the vehicle itself may have a machine learning capability, and may provide improved estimates, particularly as the system learns the tendencies and patterns of the various users who drive it over a course of months or years.

For example, in a case where a user has proposed a route of 50 kilometers (km), and the charging system and its processor have determined that the vehicle will have an energy efficiency of about 6.5 km/kWh, the system will determine that the vehicle will consume 7.7 kWh of power to reach the destination. If the vehicle starts with a full battery, having in this example 30 kWh of charge, then the vehicle will have about 22 kWh to spare on the trip. Therefore, if the user chooses, the vehicle can be put in a selling mode, and can sell up to about 70% of its capacity while still being capable of reaching its destination without needing to refuel.

Based on this finding, the system then, in step 140, displays options for the user. If the vehicle has sufficient charge to arrive at the destination, the user interface will indicate this. If the vehicle has excess of charge, the system may prompt the user to enter a sell mode. If the vehicle has less charge than is perceived to be sufficient to arrive at the destination, the system may provide a prompt asking the user whether he would prefer to stop for a charge at a charging station, or to attempt to find a partner who will sell electric power in a dynamic connection.

Figure 8:
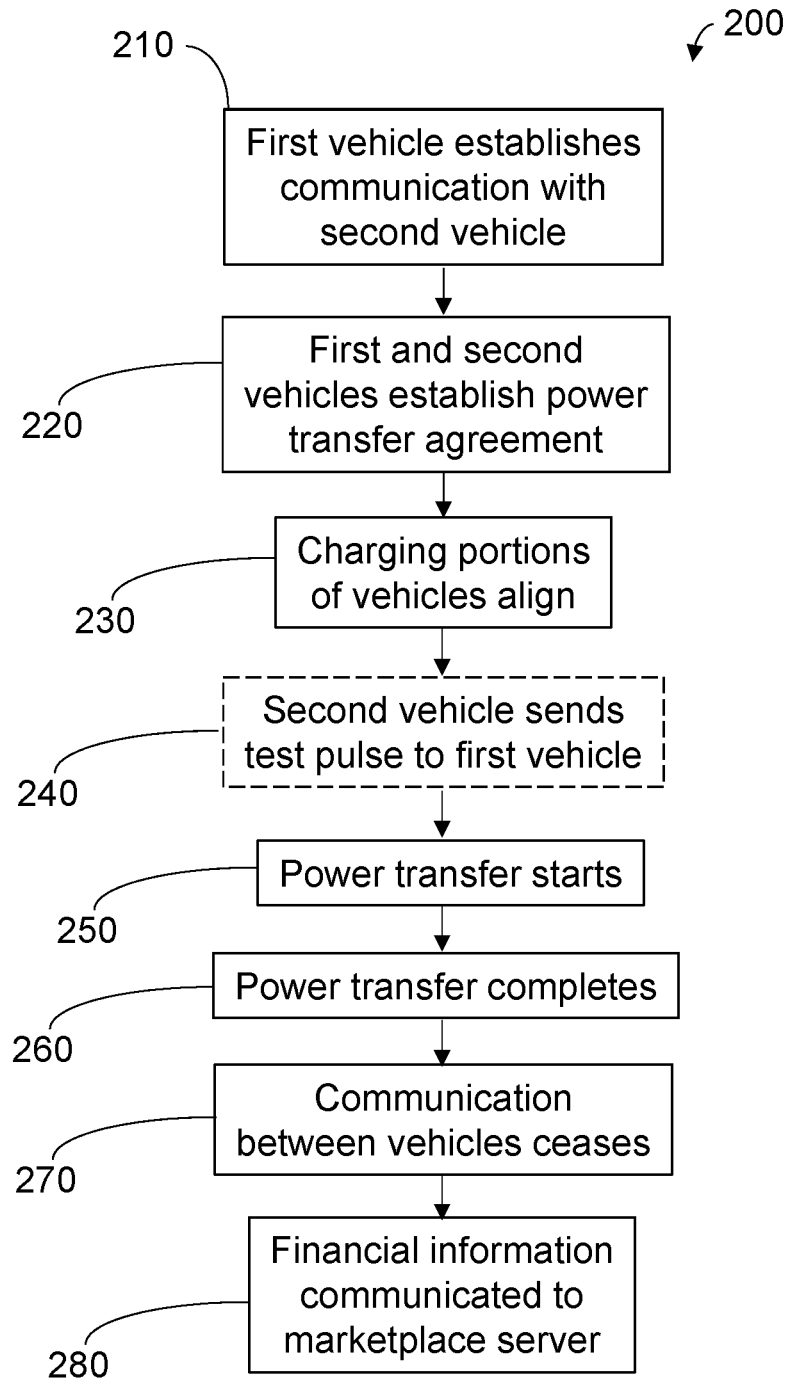
FIG. 8 is a flowchart describing steps of a method of establishing communications between vehicles and trasnferring charge therebetween in accordance with the principles of the present disclosure.

FIG. 8 illustrates a method 200 establishing a connection between two vehicles and the steps in making a transfer of electric charge. In step 210, the first vehicle may establish a communication link, such as by a dedicated short-range communications (DRSC) apparatus, WiFi, Bluetooth, a V2V network, or the like, in order to transmit information between the two vehicles. The V2V network may utilize the 802.11p wireless protocol to exchange data between vehicles. In some embodiments, the wireless network may make use of 5G-based communications.

In step 220, the two vehicles use the communications connection to establish a power transfer agreement, determining at least an amount of charge to transfer and a cost associated with said power transfer. Arriving at the cost can be accomplished in a number of ways. The users of the first and second vehicles may input a desired cost into the user interface at the time of the transaction, or they may preselect a range of acceptable costs for buying or for selling charge that remains associated with the user account until modified. In another aspect, the marketplace server itself may select a cost or range of costs and deliver these costs to the user interfaces of both the first and second vehicles for approval by the users of these vehicles.

In step 230, the charging portions of the vehicles (such as the wheels or the doors, among others) align so that electric power can be transferred from one vehicle to another. This step may be guided by the drivers of the vehicles, or may be assisted by the navigation system of one or both vehicles. More precise alignment may allow for more efficient transfer, as may a decrease in distance between the charging devices.

Optional step 240 includes the second vehicle sending a power pulse to the first vehicle in order to test whether the alignment and/or proximity of the charging portions of the vehicles is sufficient to transfer power. This test pulse may be short in duration, and the vehicles may communicate by the V2V network to determine what percentage of the delivered charge was actually received by the first vehicle. If the amount meets or exceeds a predetermined threshold value, the charging system may proceed to step 250, wherein the power transfer starts, sending either a series of pulses or a substantially continuous charge from the second vehicle to the first vehicle. If step 240 is not successful, either the navigation system can proceed to position one or both vehicles such that they align and charging becomes productive, or the transaction can be abandoned.

After delivery of the agreed-upon amount of electric power is delivered, the power transfer completes in step 260. Following the completion of power transfer, in step 270, the communication between the vehicles over the V2V network may cease, and the financial transaction may be completed using the marketplace server in step 280.

Although step 280 is depicted as a final step in the flowchart of FIG. 7, it may not succeed the end of communication in some cases, but may be carried out simultaneously with step 270, or with step 260.

In some instances, between step 250 (the initiation of power transfer) and step 260 (the completion of power transfer) the full amount of electric charge may not be transferred. This may be due to a number of factors, or for any reason; for example, in a case when the amount of charge to be transferred requires 20 minutes, the transaction may start, and due to traffic or a road closure, the selling vehicle must be rerouted to reach its destination in a timely fashion within 10 minutes. In such a case, steps 260 and 270 (cessation of power transfer and of communication between the vehicles) would conclude with only a percentage of the transfer having been completed. When power transfer completes, the system monitors whether the full amount of charge is delivered or received. If it is not, and communication between the two vehicles is not reestablished, the percentage of energy transferred may be reported to the marketplace server, and the driver of the vehicle which was in buy mode may only pay for the percentage transferred.

Figure 9:
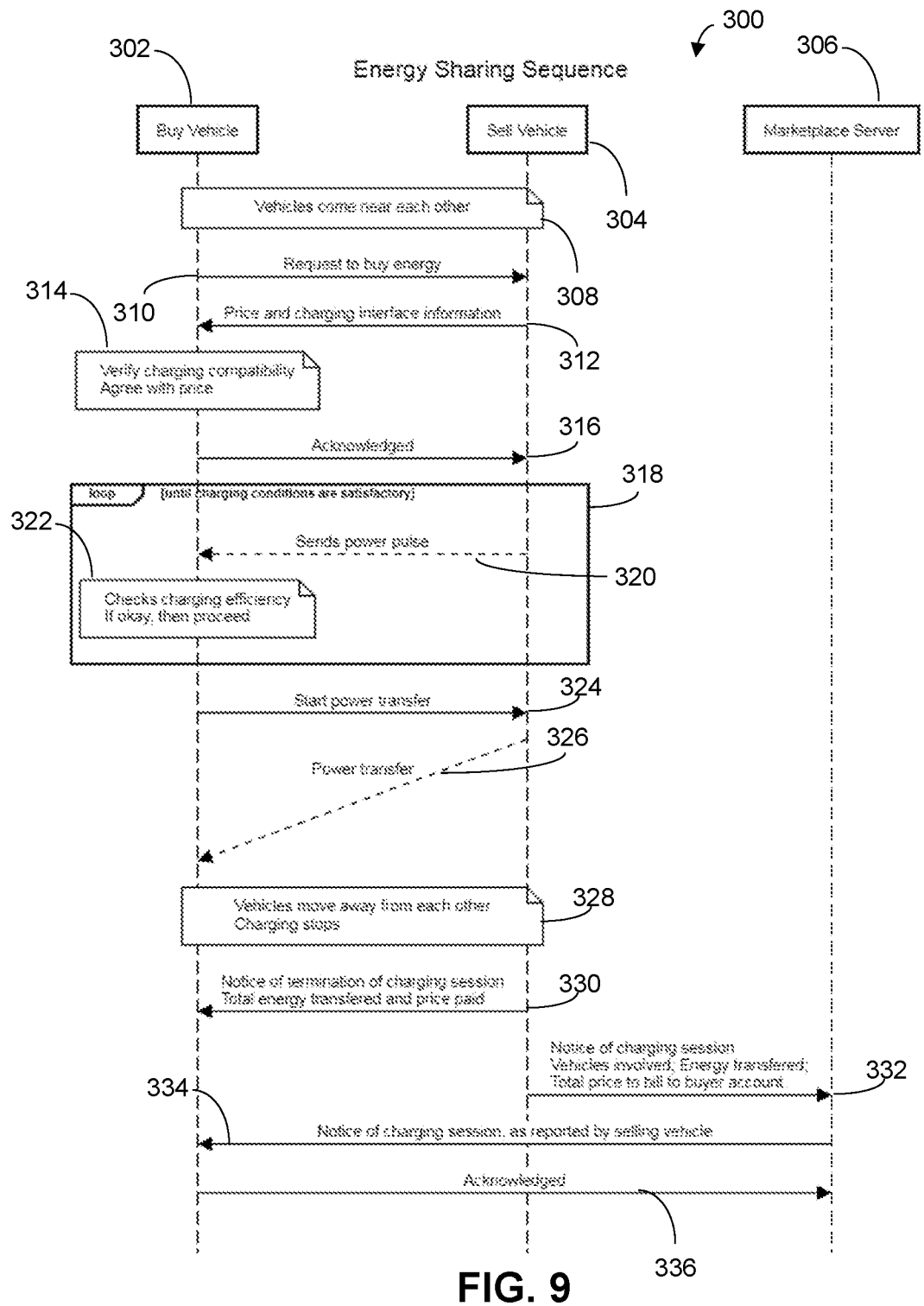
FIG. 9 is a schematic view of components of a system constructed in accordance with the principles of the present disclosure and the roles played by various components thereof.

FIG. 9 is a detailed view of an energy sharing sequence 300 in accordance with the principles of the present disclosure. In this sequence, a first vehicle 302 in a buy mode and a second vehicle 304 in a sell mode are pre-registered with an energy-sharing marketplace that employs a marketplace server 306. As the vehicles come into proximity with one another (308), the first vehicle 302 communicates a request to buy energy 310 by, in one aspect, the V2V network to the second vehicle 304.

The second vehicle 304 then sends, via the V2V network in this case, pricing 312 for the energy to be transferred and interface information. The first vehicle 302 then verifies charging compatibility and, automatically or by prompting the user and receiving an affirmative response, determines 314 that the pricing and charge amount are acceptable. If it is, the system sends an acknowledgment 316 to the second vehicle 304.

The two vehicles can then align and initiate steps of preparing to transfer power. The charging systems of the vehicles 302/304 may initiate loop 318, which functions to determine whether conditions are amenable to the transfer of electric power. In this loop 318, the second vehicle 304 sends a power pulse 320 to the first vehicle 302 and the first vehicle 302 checks to determine whether charging efficiency is high enough to proceed with charging. This may be repeated any number of times, at various distances and alignments of the two vehicles 302/304. When the conditions are found to be acceptable for charging, the first vehicle 302 may send a signal 324 to the second vehicle 304 to initiate the power transfer.

The second vehicle 304 then transfers power 326 to the first vehicle 302 until such time as the agreed-upon amount of charge is delivered, or circumstances dictate that charging cannot be completed. At this point 328 charging stops and the vehicles 302/304 may move away from one another. If the vehicles 302/304 are still in communication with one another the second vehicle 304 may send a notice 330 of the termination of the charging session to the first vehicle 302 and may provide an update on the price that is to be paid for the transferred power. The second vehicle 304 may also send a notice 332 of the same information to the marketplace server 306, which may then confirm 334 to the first vehicle 302 that the user's financial institution will be contacted and account debited for the amount of energy purchased. The first vehicle 302 may then confirm 336 these details and the transaction may then conclude.

The system, network, and method as described in the present disclosure may be practiced both with manually-operated and with autonomous vehicles. For example, two manually-operated vehicles can communicate and transfer charge between themselves, as can two autonomous vehicles, or one of each. There may be situations in which the involvement of an autonomous vehicle may be particularly noteworthy. For example, with human drivers, the presence of a vehicle in buy mode and one in sell mode in near enough proximity to coordinate with one another may be at least in part coincidental. However, a fleet of autonomous vehicles can coordinate with one another and may be substantially constantly searching for opportunities to coordinate buying and selling of charge with other vehicles communicating via the marketplace. Because human passengers in such vehicles will not be interacting with the vehicle to determine a route, small modifications to the route and adjustments of speed may not even be noticeable to passengers, allowing the vehicle to conclude the trip with a desirable power level while not significantly affecting overall travel time. Furthermore, for systems in which efficacy of charge transfer increases as the charging elements are closer together, autonomous vehicles are better suited to drive closer to one another without colliding than human drivers would be.

In one aspect, a fleet of dedicated "sell mode" autonomous vehicles may be maintained and deployed in areas of high traffic or population density. These vehicles may be kept with a high degree of charge and then may circulate in a given area, offering to sell charge to users with vehicles in a buy mode.

The charging system of a manually-operated vehicle may have sufficient automation so as to call for assistance when the battery is depleted or in danger of being depleted. The donor vehicle may be an autonomous service vehicle which is configured to undertake any single step or combinations of steps as described above automatically.

Those skilled in the art will appreciate that various modifications, additions and substitutions are possible, without departing from the scope and spirit of the disclosure in the accompanying claims.

What is claimed is:

1. A method of transferring electric power between two vehicles, the method comprising:
   determining, by a processor, a charge level of a first vehicle;
   activating, by the processor, one of a buy mode and a sell mode in the first vehicle based on the charge level;
   establishing, by a vehicle-to-vehicle communication, a wireless communications link with a second vehicle,
   determining if the second vehicle is in a buy mode if the first vehicle is in the sell mode, or if the second vehicle is in a sell mode if the first vehicle is in the buy mode;
   when the first vehicle is in the buy mode and the second vehicle is in the sell mode, determining a quantity of electric power to directly receive from the second vehicle and beginning to wirelessly and directly receive the quantity of electric power from the second vehicle; and
   when the first vehicle is in the sell mode and the second vehicle is in the buy mode, determining a quantity of electric power to transfer directly to the second vehicle and beginning to wirelessly and directly transfer the quantity of electric power to the second vehicle.

2. The method of claim 1, further comprising sending or receiving a power pulse to or from the second vehicle after establishing the wireless communications link.

3. The method of claim 1, further comprising inputting a destination into a navigation system before activating the buy mode or the sell mode.

4. The method of claim 3, wherein the processor determines the quantity of electric power to receive or transfer based on an estimated power need to reach the destination.

5. The method of claim 1, wherein the first vehicle and the second vehicle are in motion when in the buy mode or the sell mode.

6. The method of claim 5, further comprising aligning a first charging element of the first vehicle with a second charging element of the second vehicle to transfer electrical power.

7. The method of claim 6, wherein the first charging element is disposed on a wheel of the first vehicle.

8. The method of claim 7, comprising a conductive element wound about a barrel of the wheel.

9. The method of claim 6, wherein the first charging element is disposed in a door of the first vehicle.

10. The method of claim 1, wherein the buy mode or the sell mode is activated by a user of the vehicle.

11. The method of claim 1, wherein the buy mode or the sell mode is activated automatically.

12. The method of claim 1, wherein a price for buying or selling electric power is displayed on a user interface of the first vehicle prior to the step of transferring the quantity of electric power.

13. The method of claim 12, wherein when the first vehicle is in the buy mode, the user interface further displays a lowest-cost option to purchase electric power from a charging station.

14. A system for transferring electric power between two vehicles, the system comprising:
   in a first vehicle,
     one or more processors;
     a user interface in communication with the one or more processors;
     a communications system configured to communicate directly or indirectly with a second vehicle; and
     a charging element for wirelessly transferring or receiving electric power directly to or from the second vehicle, the charging element being in electrical connection with the one or more processors, the processor being configured to activate a buy mode and a sell mode, and to determine whether the second vehicle is in a buy mode or a sell mode.

15. The system of claim 14, wherein the charging element is configured to send or receive a power pulse to or from the second vehicle after establishing a communications link to the second vehicle by the communications system.

16. The system of claim 14, wherein the charging element is disposed on a wheel of the first vehicle.

17. The system of claim 14, wherein the charging element is disposed in a door of the first vehicle.

18. The system of claim 14, wherein the user interface is configured to be placed in a buy mode or a sell mode by the user interface.

19. The system of claim 18, further comprising a position sensor in electrical connection with the processor.

20. The system of claim 19, wherein the position sensor is configured to provide positional data to the processor, such that the processor can determine whether the first vehicle is in a position to transfer electric power to or receive electric power from the second vehicle.

* * * * *